United States Patent
Chawla et al.

(10) Patent No.: US 7,921,185 B2
(45) Date of Patent: Apr. 5, 2011

(54) SYSTEM AND METHOD FOR MANAGING SWITCH AND INFORMATION HANDLING SYSTEM SAS PROTOCOL COMMUNICATION

(75) Inventors: Rohit Chawla, Austin, TX (US);
Gaurav Chawla, Austin, TX (US);
Farzad Khosrowpour, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 1407 days.

(21) Appl. No.: 11/392,360

(22) Filed: Mar. 29, 2006

(65) Prior Publication Data

US 2007/0266110 A1 Nov. 15, 2007

(51) Int. Cl.
*G06F 15/16* (2006.01)
*G06F 13/10* (2006.01)

(52) U.S. Cl. .... 709/217; 370/351; 370/357; 370/395.53; 370/410; 709/213; 709/224; 709/229; 711/111; 711/112; 711/162; 711/221; 714/5

(58) Field of Classification Search ............... 379/67.1; 370/410, 395.53, 351, 357; 709/217, 224, 709/229, 213; 710/5, 62, 74, 317; 711/112, 711/162, 202, 111, 221; 714/5
See application file for complete search history.

(56) References Cited

U.S. PATENT DOCUMENTS

| | | | |
|---|---|---|---|
| 5,084,870 A | 1/1992 | Hutchison et al. | 370/94.1 |
| 6,240,467 B1* | 5/2001 | Beardsley et al. | 710/5 |
| 6,247,077 B1* | 6/2001 | Muller et al. | 710/74 |
| 6,343,324 B1* | 1/2002 | Hubis et al. | 709/229 |
| 6,363,411 B1 | 3/2002 | Dugan et al. | 709/202 |
| 6,606,690 B2 | 8/2003 | Padovano | 711/148 |
| 6,977,927 B1 | 12/2005 | Bates et al. | 370/381 |
| 7,188,209 B2* | 3/2007 | Pettey et al. | 710/317 |
| 7,260,565 B2* | 8/2007 | Lee et al. | 1/1 |
| 7,565,568 B1* | 7/2009 | Kumar et al. | 714/5 |
| 7,571,291 B2* | 8/2009 | Sasage et al. | 711/162 |
| 7,584,341 B2* | 9/2009 | Gal-Oz | 711/202 |
| 7,698,483 B2* | 4/2010 | Pettey et al. | 710/62 |
| 2005/0114464 A1* | 5/2005 | Amir et al. | 709/213 |
| 2005/0125616 A1* | 6/2005 | Johnson et al. | 711/162 |
| 2006/0155928 A1* | 7/2006 | Mimatsu | 711/112 |
| 2007/0165660 A1* | 7/2007 | Fang et al. | 370/410 |
| 2007/0266110 A1* | 11/2007 | Chawla et al. | 709/217 |
| 2009/0300178 A1* | 12/2009 | Saunderson et al. | 709/224 |
| 2010/0220732 A1* | 9/2010 | Hussain et al. | 370/395.53 |

* cited by examiner

*Primary Examiner* — Gerald Gauthier
(74) *Attorney, Agent, or Firm* — Hamilton & Terrile, LLP; Robert W. Holland

(57) ABSTRACT

An SAS domain map is automatically generated at an SAS concentrator switch by a virtual mapping device that presents itself as a target for discovery by SAS devices interfaced with the concentrator, such as information handling systems and storage devices. During the SAS protocol discovery process, the virtual mapping device generates the SAS domain map by acquiring the device name and the device port for each concentrator port that interfaces with a device. A management application running on the concentrator applies the SAS domain map to provide network functions, such as zoning or diagnostics.

20 Claims, 2 Drawing Sheets

SYSTEM AND METHOD FOR MANAGING SWITCH AND INFORMATION HANDLING SYSTEM SAS PROTOCOL COMMUNICATION

BACKGROUND OF THE INVENTION

1. Field of the Invention

The present invention relates in general to the field of information handling system communications, and more particularly to a system and method for managing switch and information handling system SAS protocol communication.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One consideration in the design and production of information handling systems is the communication of information between processing components of the information handling system. For instance, information stored in memory, such as hard disk drives, typically is communicated to a processor for use by the processor. Historically, information was passed across parallel buses within the information handling system, such as by using the SCSI protocol to communicate with hard disk drives. More recently, serial buses have provided greater data transfer rates than are available from parallel buses. For instance, the Serial Attached SCSI (SAS) protocol provides greater data transfer rates for hard disk drive storage devices than the SCSI protocol, however SAS remains compatible with SCSI commands. The SAS protocol supports rapid transfer rates within an individual information handling system as well as in distributed storage systems, such as JBOD (Just a Bunch of Disks) systems and RBOD (RAID enabled JBOD) systems. Even more rapid communication is possible with alternative bus protocols and structures, such as with Fibre channel buses, that also provide greater functionality with fabric management capabilities.

Although the SAS protocol specification does not define fabric management capabilities, SAS has gained acceptance in some portions of fabric-like markets. For instance, the SAS protocol supports communication between multiple hosts and an RBOD through a switch known as an SAS concentrator device. One example of information handling systems configured in such a manner is a blade server having multiple blade information handling systems interfaced with an RBOD through an SAS concentrator switch. A difficulty that arises in this environment is that a management application associated with the switch does not know what blade information handling systems are connected to what end devices because of the lack of fabric management capabilities in the SAS protocol. The lack of fabric management capabilities means that no topology information is available to define device name to port address mapping. Without such topology information, some desired functions are unavailable, such as setting up zoning of the various blade information handling systems to defined storage devices. In an attempt to address the lack of topology information, some proprietary solutions run applications on each node within an SAS domain that provides address information to each other. However, installation and management of the separate applications tends to be complex and, as a proprietary solution, presents end users with the need to learn different types of solutions for different types of systems.

SUMMARY OF THE INVENTION

Therefore a need has arisen for a system and method which manages switch and information handling system SAS protocol communication with topology information.

In accordance with the present invention, a system and method are provided which substantially reduce the disadvantages and problems associated with previous methods and systems for managing switch and information handling system SAS protocol communication. A virtual mapping device presents itself as a target for discovery by SAS devices. At discovery, the virtual mapping device acquires the SAS devices' name and address information to build domain topology.

More specifically, plural information handling systems and storage device arrays interface with each other using the SAS protocol through an SAS concentrator switch. An SEP virtual mapping device running on the concentrator presents itself as an SAS target for discovery by the information handling systems and storage device arrays. Upon discovery by an SAS device, the virtual mapping device acquires the name and SAS address of the SAS device, such as by issuing an SCSI command. The virtual mapping device associates the acquired name and address with the address of the concentrator port that interfaces with the SAS device to build an SAS domain table. The SAS domain table provides a network topology for all SAS devices visible to the virtual mapping device. A management application running on the concentrator switch applies the SAS domain table to provide network functions, such as zoning and diagnostics.

The present invention provides a number of important technical advantages. One example of an important technical advantage is that an SAS domain node table is automatically generated and available for access by a management application through communication with the switch under management. Generation of the domain table at a centralized location within the concentrator provides reduced complexity compared with the use of separate applications at each node. Further, a variety of types of nodes are easily integrated into an SAS domain with little or no modification to either the nodes or the management application. The availability of the domain table allows improved functionality, such as the use of zoning and more accurate diagnostics.

BRIEF DESCRIPTION OF THE DRAWINGS

The present invention may be better understood, and its numerous objects, features and advantages made apparent to those skilled in the art by referencing the accompanying

DETAILED DESCRIPTION

Information handling system devices and storage devices communicate with the SAS protocol through a switch. A virtual mapping device running on the switch acquires a name and SAS port address for each device interfaced with the switch by presenting an SAS target and applies the names and port addresses to generate a map of the devices in the SAS domain. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
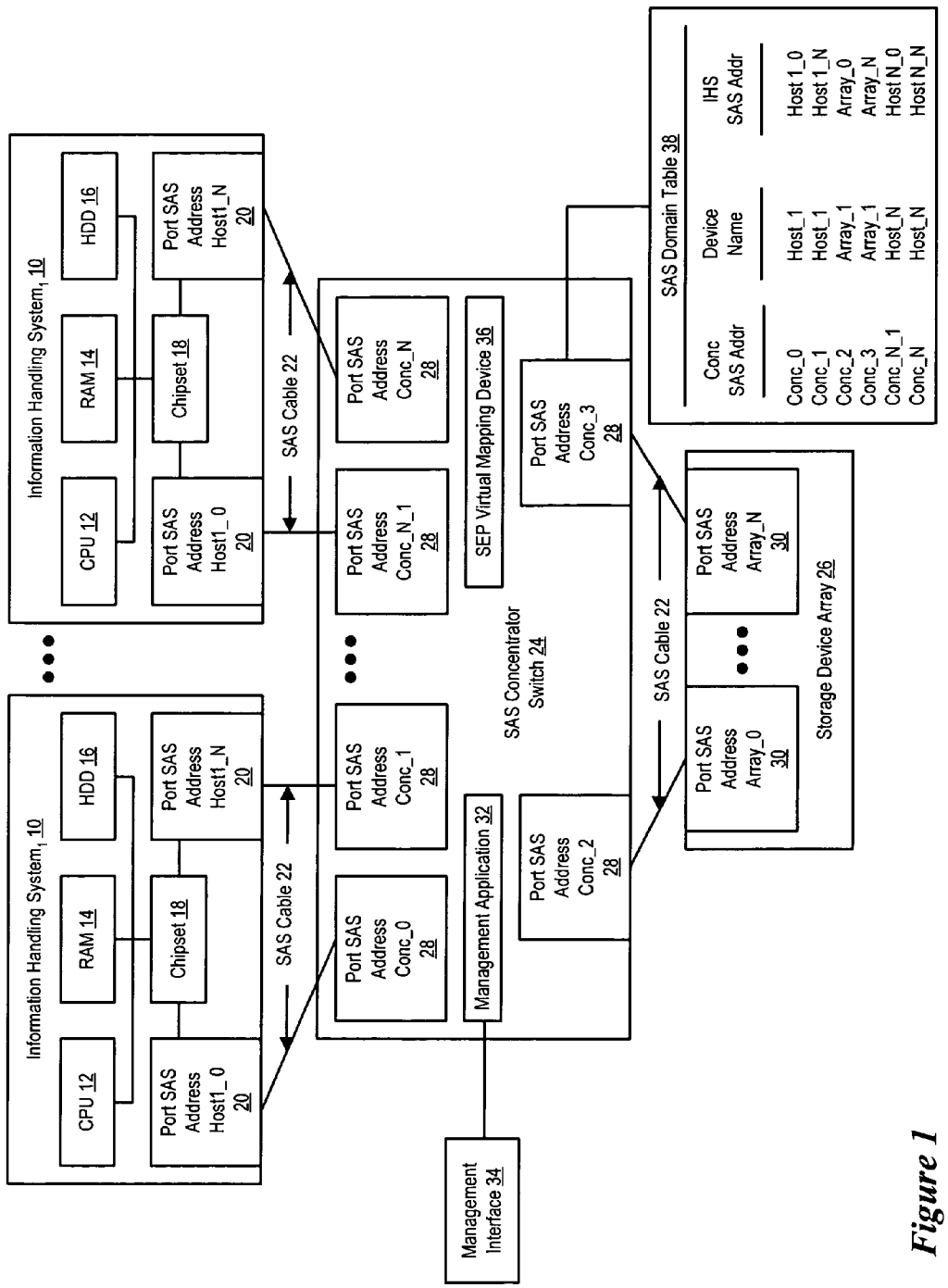
FIG. 1 depicts a block diagram of a system for managing communication of SAS devices through an SAS switch concentrator.

Referring now to FIG. 1, a block diagram depicts a system for managing communication of SAS devices through an SAS switch concentrator. Plural information handling systems 10 generate information for storage or requests to retrieve information from storage. For example, information handling systems 10 are blades disposed in a blade server. Each information handling system 10 has plural processing components to process information, such as a CPU 12, RAM 14, a hard disk drive 16 for local storage, and a chipset 18 for managing physical components and network connections. A plurality of ports interface with the processing components and external cables 22 to communicate information between information handling system 10 and external devices, such as with the SAS protocol. For example, as is depicted by FIG. 1, host information handling system SAS ports 20 interface through an SAS concentrator switch 24 to interact with one or more storage device arrays 26, such as an RBOD or a JBOD. SAS concentrator switch 24 is essentially a conventional switch that communicates information between SAS device ports based upon the SAS address of each port. Since the SAS protocol does not define fabric management capabilities, SAS concentrator switch 24 alone typically cannot track which devices are associated with which SAS addresses.

SAS concentrator switch 24 has a plurality of concentrator ports 28 that interface with SAS cables 22 from information handling systems 10 and storage device arrays 26. Information handling systems 10 access storage device array 26 with SCSI commands using SAS addresses so that concentrator 24 switches information to appropriate addresses. For instance, communication from SAS address Host1_0 to SAS address Array_n are switched from Conc_0 port to Conc_3 port. Switching functions run with firmware to support rapid data transfers while management of concentrator switch 24 is performed with a software management application 32 controlled at a management interface 34. During normal operations, information handling systems 10 and storage device arrays 26 configure themselves to interact through concentrator switch 24 by performing SAS discovery of all other devices visible through switch 24. The discovery process allows automated integration of devices added to the SAS domain.

In order to provide fabric management capabilities to the SAS domain of the devices interfaced with concentrator switch 24, an SEP virtual mapping device 36 runs on switch 24 and presents itself as an SAS target for discovery by SAS devices. When virtual mapping device 36 detects discovery by an SAS device, virtual mapping device 36 acquires the name of the device and the SAS address of the port from the device performing the discovery. The device name and address information is, for instance, acquired by sending an SCSI command to virtual mapping device 36, such as an SES command. As an alternative, the device name and address information is acquired with a vendor-unique SMP command. As an example, the information handling system_1 will send the name Host_1 and the address Host1_0 from the Host1_0 port and will send the name Host_1 and the address Host1_n from the Host1_n port. As virtual mapping device 36 acquires device names and addresses, it builds an SAS domain table 38 that associates each device name and port address with the port address for the port of concentrator switch 24 that interfaces with the device. For instance, the port Host1_0 and name Host1 are associated with the Conc_0 port. As each information handling system 10 and storage device array 26 performs discovery, a complete SAS domain table 10 is built that correlates each address of each concentrator port 28 with a device name and address for the device interfaced with the concentrator port.

Management application 32 interfaces with SAS domain table 38 to retrieve the table for application to network functions that require a network topology of the SAS domain. One example of a desirable fabric management function made available by SAS domain table 38 is zoning. Zoning allows isolation of selected SAS devices in defined zones, such as by restricting switch 24 from connecting defined ports with each other. Management application 32 enforces zoning by associating device names with concentrator ports and controlling access through the ports. Thus, for an example, a blade server is provided enhanced security by isolating access to stored information to predefined blade information handling systems of a zone. Another example of a desirable fabric management function is improved diagnostics provided by identification of the source of an error by reference to the SAS domain table.

Figure 2:
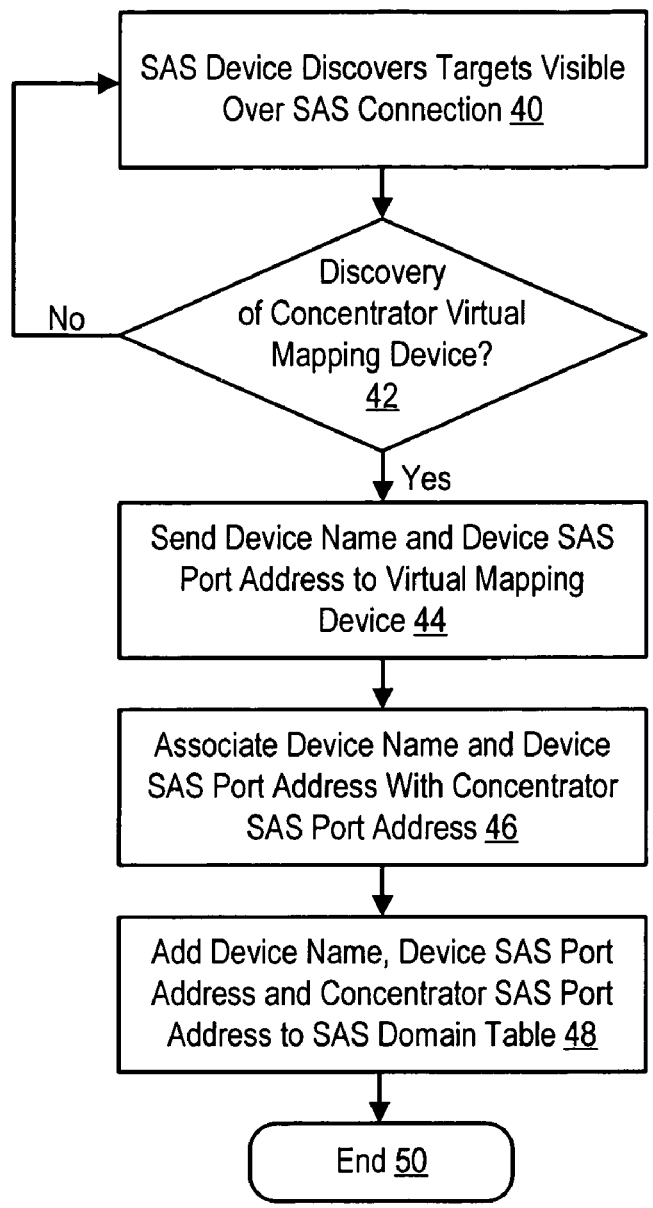
FIG. 2 depicts a flow diagram of a process for creating an SAS domain table with a virtual device running on the SAS switch concentrator.

Referring now to FIG. 2, a flow diagram depicts a process for creating an SAS domain table with a virtual device running on the SAS switch concentrator. The process begins at step 40 the SAS discovery process that discovers SAS target devices visible over the SAS connection. At step 42, if a discovered target is not the concentrator virtual mapping device, the process returns to step 40 to discover other devices. If at step 42 the discovered target is the virtual mapping device, the process continues to step 44 to have the device name and SAS port address sent to the virtual mapping device. At step 46, the virtual mapping device associates the device name and device SAS port address with the concentrator SAS port address at which the device is connected to the concentrator. At step 48, the device name, device SAS port address and concentrator SAS port address are added to the SAS domain table and the process ends at step 50. Building of the SAS domain table works within the SAS protocol discovery procedure so that minimal if any impact occurs for devices within the SAS domain.

Although the present invention has been described in detail, it should be understood that various changes, substitutions and alterations can be made hereto without departing from the spirit and scope of the invention as defined by the appended claims.

What is claimed is:

1. A system for storing information comprising:
   one or more host information handling systems, each host information handling system having a host name and plural ports, each port operable to communicate information with an associated host address;
   one or more storage devices, each storage device having a storage device name and one or more ports, each port operable to communicate information with an associated storage address;
   a switch disposed between the host information handling systems and the storage devices, the switch having plural ports, each port associated with an associated switch address;
   plural cables interfacing the host ports with the switch ports and interfacing the switch ports with the storage device ports; and
   a mapping virtual device running on the switch and operable to present itself as a target to the host information handling systems and the storage devices, the mapping virtual device further operable to acquire the host name and host address of each host port interfaced with a switch port and to acquire the storage device name and storage address of each storage port interfaced with a switch port.

2. The system of claim 1 wherein the mapping virtual device is further operable build a domain table mapping switch addresses, host addresses and storage addresses to associated host names and storage device names.

3. The system of claim 2 wherein the switch addresses, host addresses and storage addresses comprise SAS addresses.

4. The system of claim 3 further comprising a domain manager associated with the switch and operable to apply the domain table to provide one or more network functions.

5. The system of claim 4 wherein the network function comprises zoning.

6. The system of claim 4 wherein the network function comprises diagnostics.

7. The system of claim 1 wherein the switch, host information handling systems and storage devices communicate with SAS and the mapping virtual device acquires the host names, host addresses, storage device names and storage addresses by detecting SAS discovery of each host information handling system and storage device.

8. The system of claim 1 wherein the switch comprises an SAS concentrator.

9. A method for managing communication between plural information handling system ports associated with one or more information handling system and plural storage device ports associated with one or more storage devices, the method comprising:
   interfacing the information handling system ports with ports of a switch;
   interfacing the storage device ports with the ports of the switch;
   presenting a virtual device on the switch as a target to the information handling systems and the storage devices;
   acquiring at the virtual device an information handling system name and address for each information handling system port interfaced with the switch;
   acquiring at the virtual device a storage device name and address for each storage device port interfaced with the switch; and
   building a domain table that maps the information handling system names and the storage device names to a switch port and an address.

10. The method of claim 9 wherein presenting a virtual device on the switch further comprises presenting the virtual device for discovery according to the SAS protocol.

11. The method of claim 10 wherein the addresses comprise SAS addresses.

12. The method of claim 11 wherein the switch comprises an SAS concentrator.

13. The method of claim 9 further comprising:
   applying the domain table to provide one or more network functions.

14. The method of claim 13 wherein the network functions comprise zoning.

15. The method of claim 13 wherein the network functions comprise diagnostics.

16. The method of claim 9 wherein acquiring at the virtual device an information handling system name further comprises issuing an SCSI command from the virtual device to the information handling system to provide a name and SAS port address.

17. A system for interfacing devices with SAS protocol communications, the system comprising:
   an SAS concentrator having plural ports, each port operable to communicate with a device, the SAS concentrator operable to switch communications between the devices based on an SAS address associated with each port; and
   a virtual mapping device running on the SAS concentrator and operable to present as a target to the devices, the virtual mapping device acquiring the device name and SAS address for each device interfaced with the switch to create an SAS domain table.

18. The system of claim 17 further comprising a management application running on the SAS concentrator and operable to apply the SAS domain table to provide zoning of the devices.

19. The system of claim 17 further comprising a management application running on the SAS concentrator and operable to apply the SAS domain table to diagnose device operations.

20. The system of claim 17 wherein the devices comprise a blade server having plural blade information handling systems and an RBOD.

* * * * *